United States Patent [19]

Crews et al.

[11] Patent Number: 4,890,264

[45] Date of Patent: Dec. 26, 1989

[54] SEISMIC EXPLORATION METHOD AND APPARATUS FOR CANCELLING NON-UNIFORMLY DISTRIBUTED NOISE

[75] Inventors: Gary A. Crews; David R. Martinez, both of Plano, Tex.

[73] Assignee: Atlantic Richfield Company, Los Angeles, Calif.

[21] Appl. No.: 171,113

[22] Filed: Mar. 21, 1988

[51] Int. Cl.$^4$ .................................................. G01V 1/28
[52] U.S. Cl. ........................................ 367/45; 367/43; 181/112
[58] Field of Search ................... 181/112; 367/38, 43, 367/45, 907; 364/421

[56] References Cited

U.S. PATENT DOCUMENTS

| | | | |
|---|---|---|---|
| 3,397,754 | 8/1968 | Roden | 367/43 |
| 4,458,341 | 7/1984 | Goebel | 367/45 |
| 4,556,962 | 12/1985 | Widrow | 367/45 |
| 4,630,246 | 12/1986 | Fogler | 367/45 |
| 4,750,156 | 6/1988 | Abrams et al. | 367/42 |
| 4,757,480 | 7/1988 | Gutowski | 367/44 |

OTHER PUBLICATIONS

"Adaptive Noise Cancelling: Principles and Applications," Widrow et al., Proc. IEEE, vol. 63, #12, Dec. '75.

Primary Examiner—Thomas H. Tarcza
Assistant Examiner—Ian J. Lobo
Attorney, Agent, or Firm—Andrew J. Dillon; Albert C. Metrailer; F. Lindsey Scott

[57] ABSTRACT

A seismic exploration method and apparatus in which non-uniformly distributed noise signals generated by wind, machinery, or surface wave propagation and received by the sensing geophones are cancelled by the utilization of adaptive filter processing. A number of horizontally sensitive geophones are disposed along the surface of the earth to detect surface waves induced in the surface of the earth at a plurality of spaced locations throughout an entire area of investigation. Similarly, a number of wind noise and mechanical noise detectors are utilized to detect airwave and noise signals at a plurality of locations throughout the area of investigation. The outputs of the surface wave detectors, the wind noise detectors and the mechanical noise detectors may then be utilized in conjunction with an adaptive filter to effectively cancel the effects of such interferences on reflected seismic wave signals at multiple locations throughout the area of investigation so that non-uniformly distributed noise signals may be accurately eliminated.

13 Claims, 2 Drawing Sheets

SEISMIC EXPLORATION METHOD AND APPARATUS FOR CANCELLING NON-UNIFORMLY DISTRIBUTED NOISE

BACKGROUND OF THE INVENTION

1. Field of the Invention:

This invention relates in general to seismic exploration systems and in particular to seismic exploration systems which incorporate techniques and methods for cancelling non-uniformly distributed noise signals.

2. Description of the Prior Art:

In known seismic exploration systems, seismic waves are typically induced by a plurality of pulses of sonic vibration which are generally applied over a predetermined period and which generally have a predetermined frequency sequence. The applied vibration penetrates the earth so that reflections from deep layers can be detected by sensing devices or geophones at the earth's surface. These reflections can then be related to the geologic layering within the earth. Sonic vibrations applied to the earth's surface also generate a so-called "surface wave" which radiates in a shallow layer in all directions from the point of application. Sensing devices or geophones positioned on the earth's surface which are intended to receive waves from deep reflecting layers within the earth also receive this surface wave. The reflected waves from deep within the earth's surface are of great interest and the presence of surface waves, as well as other noises, provide interference which make it difficult to accurately ascertain information concerning the geologic layering within the earth.

This problem is exacerbated by the fact that surface waves demonstrate a much higher amplitude than reflected waves and the arrival of a surface wave at a particular geophone may occur simultaneously with the arrival of the desired reflected waves.

Several methods are known in the prior art for limiting the aforementioned interference from surface waves. Typically, geophones are not utilized individually but rather are connected together in sub-arrays which are added or averaged by connecting the geophones in series and parallel combinations or completely in parallel or completely in series. These sub-arrays are then deployed along the surface of the earth over a distance of one or more wavelengths of the surface waves. For example, if the applied vibrations are of a frequency modulated sinusoidal wave of finite duration sweeping, for example, in frequency from ten hertz to seventy-five hertz, the longest wavelength would occur at ten hertz. If the speed of propagation of the surface wave is between one thousand and two thousand feet per second, then the ten hertz wavelength would be between one hundred and two hundred feet. If the sub-array is spread so that its elements extend over two hundred feet or more on a radial line from the vibration source, substantial cancellation of the surface waves may take place as the sub-array geophone signals are added to one another.

This technique causes some cancellation of surface waves without affecting the seismic waves arriving from deep reflecting layers. These reflected waves arrive at the surface at angles close to vertical and since their apparent horizontal propagation speed is much higher than the propagation speed of surface waves, the difference in arrival time among the sub-array geophones is negligible and cancellation of deep arriving waves does not take place. Thus, the utilization of sub-arrays of geophones enhances the ratio of reflected wave signals to direct surface wave signals over that which could be obtained utilizing single geophones.

Another method of cancelling undesired interference utilizes matched filtering to cut down on random noise received from within the earth and also to cut down on vibrations received via the surface wave from the source of vibrations. For example, a low frequency cutoff of sweep bandwidth will act to attenuate the surface wave. The known transmitted waveform taken from the source of vibration is cross-correlated in a cross-correlator with the signal output of the geophone sub-array. The time lag between the known transmitted waveform and the received geophone sub-array signal is set in the cross-correlator to correspond to the two-way travel time from the surface down to the target reflector zone and then back to the surface. In the absence of surface waves, the cross-correlation corresponds to the amplitude of the reflected wave from the target depth. Random noise from the earth tends to be eliminated by this technique because it does not correlate with the transmitted waveform. Also, reflected energy from depths other than the target depth do not correlate with the transmitted waveform when it is time lagged for a particular target depth. However, some correlation which is non-zero will result from the surface waves which will severely interfere with the correlation of the reflected wave with the transmitted wave. This would generally not be a problem except for the fact that the amplitude of the surface wave is so much greater than the amplitude of the reflected wave and the uncorrelated recording of data includes the interference of noise throughout the record.

Recently, U.S. Pat. No. 4,556,962, issued to Widrow, teaches a method of cancelling surface waves which utilizes adaptive filtering techniques to attempt to cancel the interference caused by surface waves. This method utilizes one receiving seismic detector which is placed on the surface of the earth near the source of sonic vibrations to generate a reference signal which is representative of the applied seismic wave. This reference signal is then adaptively filtered and combined with the outputs of various seismic detectors to subtract the surface wave signal from the detector outputs to provide an output signal which is representative of the seismic waves reflected from deeper formations.

While this latest technique represents an improvement in the art, it does not address the problems associated with machinery noise, wind noise or airwave and it does not address the fact that surface wave interference is not uniformly distributed throughout an area of investigation. That is, the interference caused by the surface wave at one location may be substantially different from the interference which occurs at a second location due to anomalies within the surface of the earth or other variable parameters. Similarly, airwave and wind noise may vary substantially from one portion of the area of investigation to a second portion due to physical characteristics of the area of investigation or the direction of the wind. And, of course, those skilled in the art will recognize that machinery noise caused by compressors, rock crushers, or pumps may dramatically affect the accuracy of seismic measurements at locations within the area of investigation which are close to the source of such mechanical noises.

Therefore, it should be obvious that a need exists for a seismic exploration method and apparatus which can be utilized to effectively cancel non-uniformly distributed noise throughout a wide area of investigation.

SUMMARY OF THE INVENTION

It is therefore one object of the present invention to provide an improved seismic exploration method and apparatus.

It is another object of the present invention to provide an improved seismic exploration method and apparatus which effectively cancels non-uniformly distributed noise throughout the area of investigation.

It is yet another object of the present invention to provide an improved method and apparatus for seismic exploration which can be utilized to effectively cancel non-uniformly distributed noise while not requiring a substantial increase in data transmission capability.

The foregoing objects are achieved as is now described. The seismic exploration method and apparatus of the present invention may be utilized to eliminate non-uniformly distributed noise signals such as wind noise, machinery noise, or surface wave propagation by the utilization of an adaptive filter processing technique. A number of horizontally sensitive geophones are disposed along the surface of the earth to detect surface waves induced in the surface of the earth at a plurality of spaced locations along an entire area of investigation. In three dimensional surveys surface waves may be detected by the utilization of two horizontally sensitive geophones which are mutually perpendicular. Similarly, a number of wind noise and mechanical noise detectors may also be utilized to detect noise signals at a plurality of locations throughout the area of investigation. The outputs of the surface wave detectors, the wind noise detectors, and the mechanical noise detectors are then utilized in conjunction with an adaptive filter to effectively cancel the effect of such interference on reflected seismic wave signals at multiple locations so that the non-uniformly distributed noise signals may be accurately eliminated.

The above as well as additional objects, features, and advantages of the invention will become apparent in the following detailed description.

BRIEF DESCRIPTION OF THE DRAWING

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
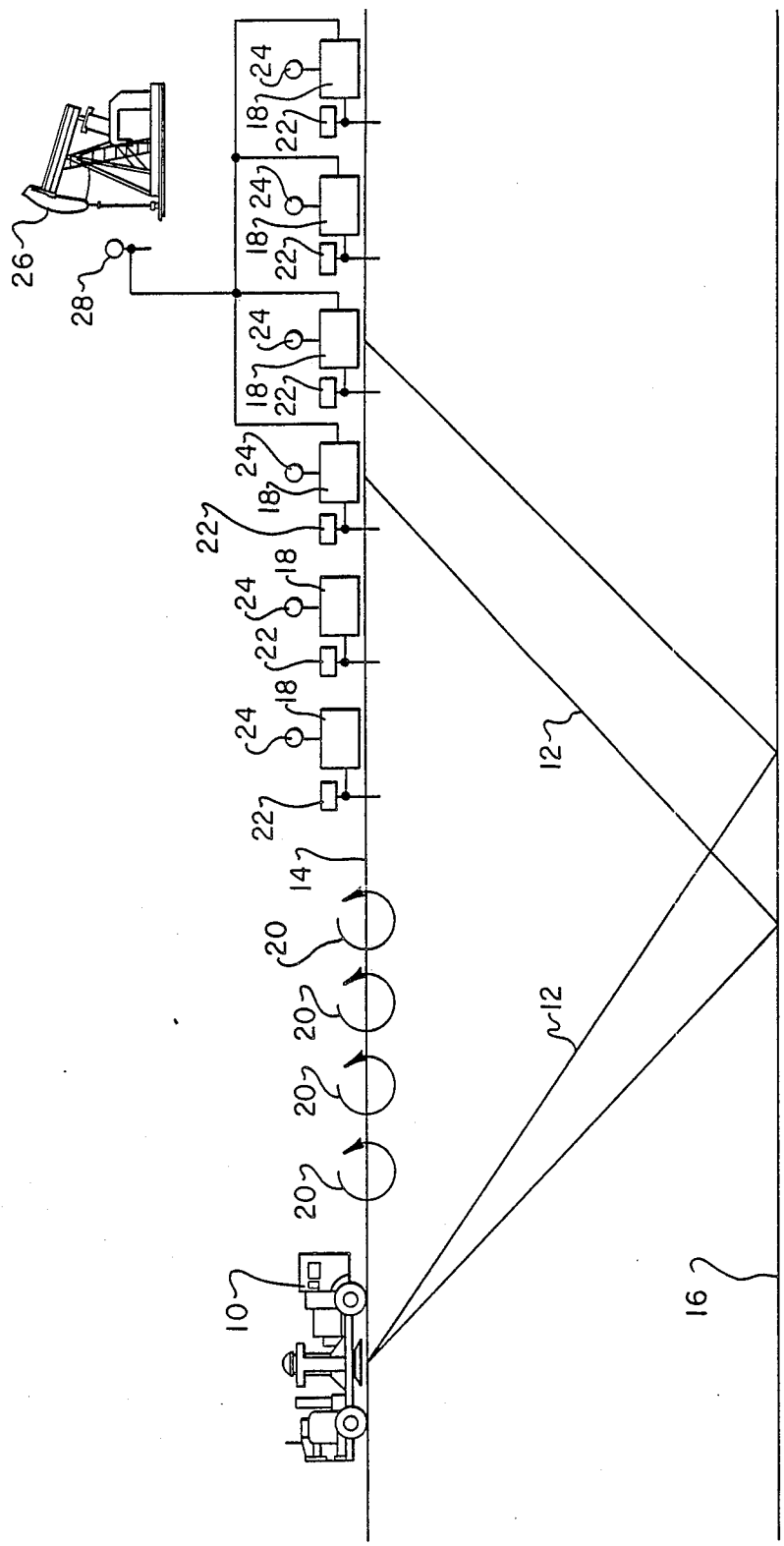
FIG. 1 is a schematic diagram of the seismic exploration method and apparatus of the present invention.

With reference now to the figures and in particular with reference to FIG. 1, there is depicted a schematic diagram of the seismic exploration method and apparatus of the present invention. As can be seen, a seismic vibration source 10 is utilized to cause seismic waves 12 to penetrate the surface of the earth 14 and reflect off various formations 16 to return to surface 14. As is common in seismic exploration systems, reflected seismic waves 12 are then detected by a plurality of surface geophone detectors (not shown) which are all connected to a plurality of remote data acquisition units 18. Those skilled in the art will appreciate that remote data acquisition units 18 are typically coupled, via conductive or optical fiber links, to a central recording unit, and are generally disposed along a line which may exceed several miles in length.

As previously described, seismic vibration system 10 also generates a plurality of surface waves 20, sometimes referred to as "ground roll." These surface waves were first described mathematically by Lord Rayleigh in the nineteenth century and are generally thought to possess a property known as "elliptical retrograde particle motion." It should be noted that such waves may be modeled mathematically for simple earth models; however, actual waves observed in nature are quite complex and do not propagate in a uniform manner. Thus, systems which attempt to filter out such surface waves utilizing a signal obtained from a single location are not generally successful and the multiple recordings necessary to operate with vibrational sources cause these surface wave signals to "smear"the data recordings and further degrade the desired recording of a reflected seismic wave.

In order to effectively cancel the effects of surface wave 20 throughout the area of investigation, it is necessary to effectively measure surface wave 20 at the location of each remote data acquisition unit 18. This is accomplished by the utilization of surface wave detectors 22, which are disposed at the location of each remote data acquisition unit 18. The Applicants' have discovered that by utilizing horizontally sensitive geophones to provide surface wave detectors 22, it is possible to generate a signal highly representative of surface waves 20 by pointing each surface wave detector 22 at seismic vibration source 10. In actual practice, one surface wave detector 22 may be utilized in conjunction with one or a small group of vertically sensitive geophones which may be utilized to detect reflective seismic waves. In the event of 3-D surveys, surface wave detector 22 may be implemented by utilizing two horizontally sensitive geophones which are perpendicular to each other. In accordance with the present invention, the outputs of surface wave detectors 22 may then be utilized to cancel the effects of surface wave 20.

Those skilled in the art will appreciate that ground roll or surface waves are not the only non-uniformly distributed noise signals which can adversely effect the detection reflected seismic waves. Another such non-uniformly distributed noise signal is wind noise which may vary substantially from one portion of the area of investigation to another. In order to effectively cancel this non-uniformly distributed wind noise, the method and system of the present invention incorporates a plurality of air noise detectors 24.

In a preferred embodiment of the present invention, air noise detectors 24 are preferably implemented by utilizing a plurality of microphones which are adapted to detect wind noise which adversely effects the recording of seismic waves by moving cables or geophones and thereby inducing a noise signal into the desired recording of seismic waves. As above, the outputs of the various air noise detectors 24 may be utilized to effectively cancel the non-uniformly distributed effect of wind noise, in accordance with the present invention.

Finally, it should be appreciated that given the distances encountered in modern seismic exploration systems, it is also possible to encounter non-uniformly distributed mechanical noise which may be generated by compressors, rock crushers, pumps, or vehicle noises. As depicted in FIG. 1, a pump 26 is present which will generally cause periodic noise emanations which will interfere with the recording of seismic waves reflected from formations within the earth. The effect of this mechanically induced noise is cancelled in accordance with the present invention by generating a noise signal by utilizing a noise detector 28. Noise detector 28 is preferably provided by utilizing a strong motion geophone. The output of noise detector 28 is then preferably coupled to selected ones of remote data acquisition units 18, to cancel the effect of the noise signal in accordance with the present invention. Those skilled in this art will appreciate that multiple noise signal sources may be cancelled by generating multiple noise signals which may be coupled to selected remote data acquisition units for utilization in accordance with the method of the present invention. For example, in marine applications it is possible to effectively cancel multiple noise source signals which are non-uniformly distributed throughout the system.

Figure 2:
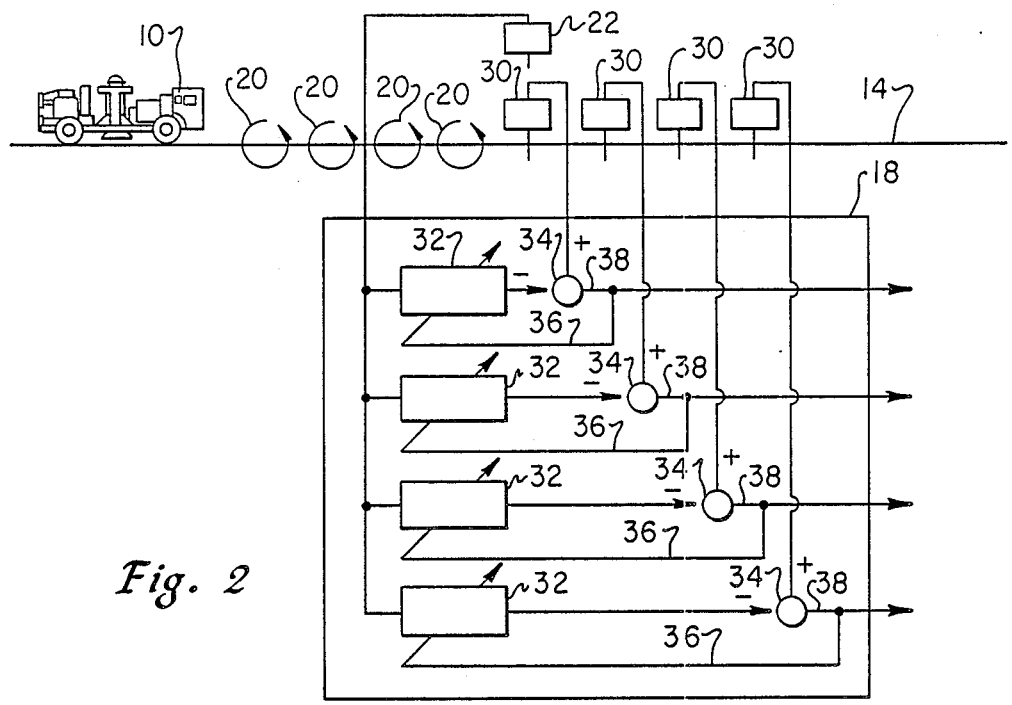
FIG. 2 is a schematic representation of the seismic exploration method and apparatus of the present invention as applied to the cancellation of surface wave interference.

With reference now to FIG. 2, there is depicted a schematic representation of the seismic exploration method and apparatus of the present invention, as applied to the cancellation of surface wave interference or wind noise. As can be seen, vibration source 10 creates a series of surface waves 20, which are detected by surface wave detector 22 in the manner described above. The output of surface wave detector 22, at each remote data acquisition unit 18, is then coupled to a plurality of adaptive processors 32. One example of such a device is Model No. 416, manufactured by Adaptive Digital Systems, Inc., of Irvine, Calif. Each adaptive processor 32 then adjusts the amplitude and phase of the surface wave noise signal by a continuously adaptive process before coupling its output to combiner 34. As those skilled in the art of adaptive filters will appreciate, this combination of the outputs of a plurality of vertically sensitive geophones 30 with the outputs of each adaptive processor 32, will yield an output signal 38.

This output signal 38 is then utilized, via feedback loop 36, to continuously adjust the output of each adaptive processor 32. In this manner, output signal 38 is continuously adjusted to achieve a minimum correlation with the surface wave noise signal detected by surface wave detector 22. When this minimum correlation is achieved, the effect of surface wave interference is effectively cancelled. Experimentation has shown that this technique will result in a surface wave suppression on the order of 24dB. Of course, the amount of cancellation is bounded by a floor which is established by the level of ambient noise.

It should also be apparent that while the embodiment depicted in FIG. 2 demonstrates the utilization of four vertically sensitive geophones 30 with a single surface wave detector 22, that number may be increased or decreased as desired. Further, this technique may be easily utilized to cancel the effect of non-uniformly distributed airwave or wind noise by substituting a air noise detector 24 for surface wave detector 22. Additionally, while the adaptive processors 32 and combiners 34 are depicted as disposed within remote data acquisition units 18, in order to minimize data transmission requirements, the output of surface wave detector 22 may be simply coupled to a central recording facility so that surface wave cancellation may be accomplished at the central recording facility or at a central processing facility. Of course, those skilled in the art will appreciate that this will require a substantial increase in the amount of data which must be transmitted. The advantages of the present invention will be preserved so long as a signal indicative of the surface wave signal or wind noise at a plurality of locations is obtained in order to effectively cancel the non-uniformly distributed surface wave noise or wind noise at those locations.

Figure 3:
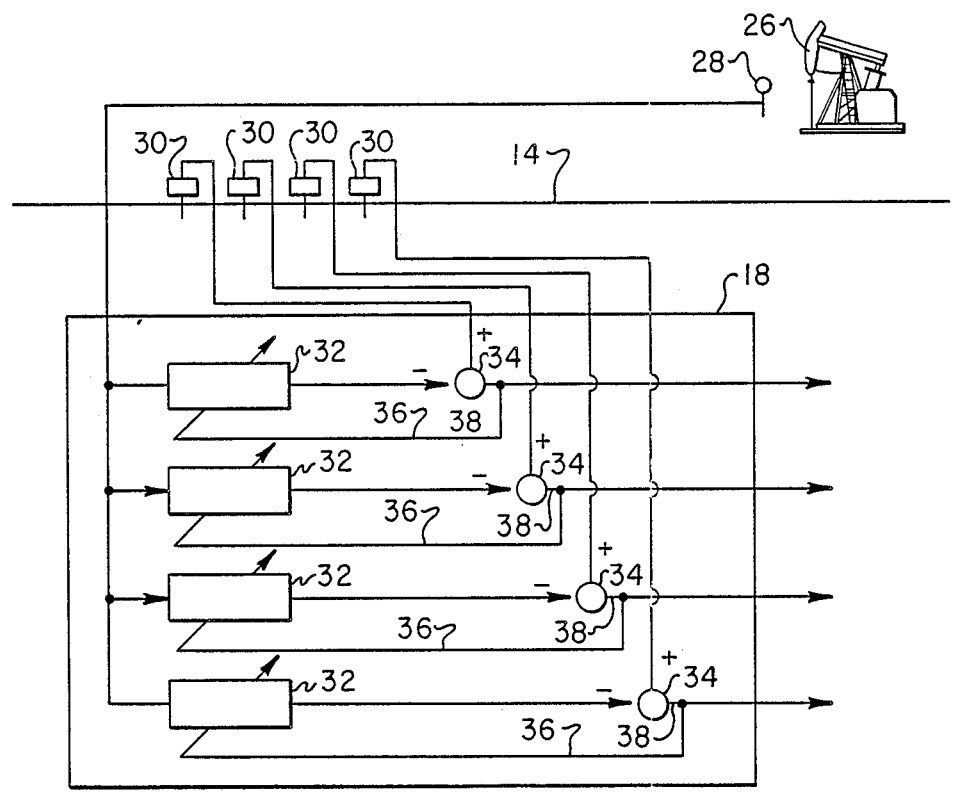
FIG. 3 is a schematic representation of the seismic exploration method and apparatus of the present invention as applied to the elimination of mechanical noise signals.

Referring now to FIG. 3, there is depicted a schematic representation of the seismic exploration method and apparatus of the present invention, as applied to the elimination of non-uniformly distributed mechanical noise signals. As can be seen, a mechanical noise sensor 28 is preferably disposed adjacent to a source of mechanical noise, such as pump 26. The output of mechanical noise sensor 28 is then coupled to a plurality of adaptive processors 32 in the same manner as depicted in FIG. 2. As above, the output of each adaptive processor 32 is then coupled to a combiner 34 and continuously adaptively processed to achieve a minimum correlation with the output of combiner 34. Thus, the method of the present invention effectively minimizes the noise generated by pump 26 on the recording of seismic wave data. As above, the number of geophones which are coupled to each remote data acquisition unit may be varied to suit a particular application.

As described herein, the adaptive noise and cancellation system disclosed may be utilized to suppress all forms of non-uniformly distributed noise and thereby minimize ambient noise in seismic wave recording. These objectives are achieved by measuring reference noises at a plurality of appropriate locations that are in a generally linear sense representative of the interfering noises present in seismic signals at those locations. Once an excellent representation of these noises through the adaptive process has been derived, the desired signals are enhanced by subtracting the unwanted noise interference signals. This approach offers several advantages which make it highly suitable for geophysical applications. A first advantage over conventional noise suppression techniques may be achieved by the utilization of a high sampling rate. A typical digital sampling rate for the adaptive processors utilized in the present invention is equal to or greater than 3.5 kilohertz, which is substantially higher than the five hundred hertz sampling rate commonly utilized in conventional seismic recorders. A second advantage which may be achieved is inherent in the fact that noise cancellation is implemented before correlation and its concomitant vertical stacking takes place. Those skilled in the art will appreciate that with vibrational source recording techniques, the process of correlation will "smear⇌interfering noise throughout the record. For example, certain noise signals contain significant amounts of harmonic signals. Another source of correlation noise may be caused by the high amplitudes of the correlation side lobes relative to the small amplitude of the seismic wave reflection signals. Thus, noise cancellation which takes place prior to signal correlation will minimize the noise smearing problem. The cancellation of noises before vertical stacking permits the noise cancellers to adapt to the interferences present on a single recording better than if these noises had been added together. In this manner, multiple transfer functions are continuously calculated throughout each sweep at each vibrator point. For example, pump noise may vary from record to record in a group of repetitive sweeps, so that a different transfer function is necessary for each sweep.

The higher sampling rate permitted with the present invention also allows the noise cancellation technique of the present invention to converge rapidly to the required noise cancellation. In addition, sampling at such higher rates increases the "useable" dynamic resolution. This latter advantage occurs because at higher sampling rates one approximates an analog signal more accurately than is possible at lower sampling rates. Since the objective of adaptive cancellation is to suppress the unwanted noise signals, and not just to reconstruct the sampled data from frequency samples, the finer the sampling of both signal and noise, the better the noise may be eliminated from the signal. Thus, higher sampling rates provide a higher number of useable bits available for the necessary computations. An attempt to duplicate such high-fidelity processing at a central location would require an inordinate amount of computer time and magnetic storage media.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. For example, those skilled in the art will appreciate that this technique may be utilized to remove undesired P-wave components from the shear wave signal during shear wave exploration. It is therefore contemplated that the appended claims will cover any such modifications or embodiments that fall within the true scope of the invention.

What is claimed is:

1. A method of seismic exploration comprising the steps of:
   generating and applying seismic waves to the surface of the earth, said waves traveling into the earth and reflecting from formations in the earth and also traveling along the surface of the earth in a nonuniformly distributed manner;
   placing a plurality of seismic detectors on the surface of the earth at a plurality of locations spaced on the surface of the earth from the point of application of said seismic waves for receiving said seismic waves reflecting from formations in the earth;
   placing at each of said plurality of locations at least one surface wave detector adapted to receive said nonuniformly distributed surface waves;
   placing at least one mechanical noise detector adapted to receive mechanical noise signals proximate to a source of nonuniform mechanical noise; and
   adaptively processing said seismic waves received at each of said plurality of locations in combination with said nonuniformly distributed surface waves received at each of said plurality of locations and said received mechanical noise signal to produce an output signal representative of seismic waves reflecting from formations in the earth.

2. An apparatus for seismic exploration in the vicinity of one or more sources of non-uniform mechanical noise, comprising:
   means for generating seismic waves at a selected location on the earth's surface;
   a plurality of seismic detectors disposed on the surface of the earth at a plurality of locations spaced from said selected location for receiving said seismic waves;
   at least one mechanical noise detector disposed in proximity to each of said sources of non-uniform mechanical noise for detecting noise signals; and
   adaptive filter means coupled to the output of each of said plurality of seismic detectors in the vicinity of a source of non-uniform mechanical noise and the output of said at least one mechanical noise detector for producing an output signal representative of seismic waves reflecting from formations in the earth wherein noise signals are removed from said seismic waves.

3. An apparatus for seismic exploration according to claim 2 wherein said means for generating seismic waves comprises a vibrational source.

4. An apparatus for seismic exploration according to claim 2 wherein said plurality of seismic detectors comprises a plurality of vertically sensitive geophones.

5. An apparatus for seismic exploration according to claim 2 wherein said adaptive filter means comprises an adaptive processor and a combining means and wherein the output of said adaptive processor is subtracted from the output of each of said plurality of seismic detectors by said combining means to produce an output signal representative of seismic waves reflecting from formations in the earth.

6. An apparatus for seismic exploration comprising:
   means for generating seismic waves at a selected location on the earth's surface;
   a plurality of seismic detectors disposed on the surface of the earth at a plurality of locations spaced from said selected location for receiving said seismic waves;
   at least one air noise detector at each of said plurality of locations for detecting nonuniformly distributed air noise signals; and
   adaptive filter means coupled to the output of each of said plurality of seismic detectors and the output of said at least one wind noise detector at each of said plurality of locations for producing an output signal representative of seismic waves reflecting from formations in the earth wherein said nonuniformly distributed air noise signals are removed from said seismic waves.

7. An apparatus for seismic exploration according to claim 6 wherein said means for generating seismic waves comprises a vibrational source.

8. An apparatus for seismic exploration according to claim 7 wherein said plurality of seismic detectors comprises a plurality of vertically sensitive geophones.

9. An apparatus for seismic exploration according to claim 6 further including at least one surface wave detector at each of said plurality of locations adapted to receive non-uniformly distributed surface waves induced along the surface of the earth by said means for generating seismic waves.

10. An apparatus for seismic exploration according to claim 9 wherein said adaptive filter means is coupled to output of said at least one surface wave detector wherein said nonuniformly distributed surface waves are removed from said seismic waves.

11. An apparatus for seismic exploration according to claim 10 wherein each of said surface wave detectors comprises a horizontally sensitive geophone.

12. An apparatus for seismic exploration according to claim 11 wherein each of said horizontally sensitive geophones is disposed along the surface of the earth directed at said means for generating seismic waves.

13. An apparatus for seismic exploration according to claim 12 wherein said adaptive filter means comprises an adaptive processor and a combining means and wherein the output of said adaptive processor is subtracted from the output of each of said plurality of seismic detectors by said combining means to produce an output signal representative of seismic waves reflecting from formations in the earth.

* * * * *